(12) United States Patent
Matsuda (10) Patent No.: US 8,485,506 B2
(45) Date of Patent: Jul. 16, 2013

(54) VIBRATION ISOLATING APPARATUS (75) Inventor: Naohisa Matsuda, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 326 days.

(21) Appl. No.: 12/936,046

(22) PCT Filed: Apr. 6, 2009

(86) PCT No.: PCT/JP2009/057056
§ 371 (c)(1),
(2), (4) Date: Oct. 1, 2010

(87) PCT Pub. No.: WO2009/123351
PCT Pub. Date: Oct. 8, 2009

(65) Prior Publication Data
US 2011/0031663 A1    Feb. 10, 2011

(30) Foreign Application Priority Data
Apr. 4, 2008  (JP) .................................. 2008-098084

(51) Int. Cl.
*F16F 5/00*    (2006.01)
(52) U.S. Cl.
USPC ................. 267/140.13; 267/140.11
(58) Field of Classification Search
USPC ..... 267/140.13, 140.11, 141.2, 219; 180/300, 180/312; 248/562, 636
See application file for complete search history.

(56) References Cited

U.S. PATENT DOCUMENTS

| | | | |
|---|---|---|---|
| 5,964,456 A * | 10/1999 | Someya | 267/140.13 |
| 2001/0004141 A1 | 6/2001 | Shimoda et al. | |
| 2006/0006591 A1 | 1/2006 | Grassmuck | |
| 2007/0176339 A1 | 8/2007 | Minamisawa | |
| 2009/0008195 A1 | 1/2009 | Ueki | |
| 2010/0072683 A1* | 3/2010 | Saito et al. | 267/140.13 |

FOREIGN PATENT DOCUMENTS

| | | |
|---|---|---|
| JP | 2001-165231 A | 6/2001 |
| JP | 2006-22962 A | 1/2006 |
| JP | 2007-232207 A | 9/2007 |
| WO | 2007/029739 A1 | 3/2007 |

OTHER PUBLICATIONS

International Search Report of PCT/JP2009/057056 dated May 26, 2009.

* cited by examiner

*Primary Examiner* — Pamela Rodriguez
(74) *Attorney, Agent, or Firm* — Sughrue Mion, PLLC (57)    ABSTRACT

This vibration isolating apparatus (1) includes a cylindrical first mounting component (6), a second mounting component (7), a rubber elastic body (8), a diaphragm (5), and a partitioning component (4). The partitioning component (4) is formed entirely from an elastic body, and on the first mounting component (6) there are provided a protruding portion (60) and a first cylindrical portion (62), and a toroidal rigid component (50) is fitted on an inner side of the first cylindrical portion (62), and in the rigid component (50) there are provided a second cylindrical portion (53) and a supporting portion (54).

4 Claims, 5 Drawing Sheets

VIBRATION ISOLATING APPARATUS

TECHNICAL FIELD

The present invention relates to a vibration isolating apparatus that is used, for example, when a vibration generating portion such as an engine of an automobile is mounted in a vibration receiving portion such as a vehicle body.

Priority is claimed on Japanese Patent Application No. 2008-98084, filed Apr. 4, 2008, the contents of which are incorporated herein by reference.

BACKGROUND ART

As this type of vibration isolating apparatus, an apparatus having a structure such as that described, for example, in Patent document 1 (see below) is conventionally known. This apparatus is provided with a cylindrical first mounting component that is linked to a vibration receiving portion such as a vehicle body or the like, a second mounting component that is linked to a vibration generating portion such as an engine or the like, a rubber elastic body that elastically links together the first mounting component and the second mounting component and closes off a top side aperture end of the first mounting component, a diaphragm that closes off a bottom side aperture end of the second mounting component, and a partitioning component that divides a liquid chamber which is formed between the rubber elastic body and the diaphragm into a main liquid chamber of whose partition walls a portion is formed by the rubber elastic body and an auxiliary liquid chamber of whose partition walls a portion is formed by the diaphragm. This partitioning component and diaphragm are formed entirely from rubber. The partitioning component is fitted inside the first mounting component through the bottom side aperture end thereof, and the diaphragm is then fitted after the partitioning component. A cup-shaped holder is then fitted such that it covers the first mounting component from the bottom side thereof, and the diaphragm is thereby supported from underneath by this holder. Accordingly, the partitioning component and the diaphragm are sandwiched in a mutually superimposed state between the rubber elastic body and a holder, thereby resulting in a vibration isolating apparatus having the above described structure being assembled. In a vibration isolating apparatus having the above described structure, because the partitioning components are formed entirely from rubber, it is possible to suppress the generation of abnormal noise caused by cavitation.

PRIOR TECHNOLOGY DOCUMENTS

[Patent Documents]
[Patent document 1] Japanese Patent Application, First Publication No. 2001-165231

DISCLOSURE OF THE INVENTION

Problems to be Solved by the Invention

However, in the above described conventional vibration isolating apparatus, when the holder is placed so as to cover the first mounting component, the diaphragm is pressed upwards by the holder, and the partitioning component is also pressed upwards by the diaphragm. Because of this, if this pressing force is weakened, a reduction in the seal property and the air-tightness of the liquid chamber deteriorates is occurred. Accordingly, it is necessary to strengthen the aforementioned pressing force in order to secure the proper seal property However, by increasing the pressing force, the partitioning component which is made entirely from rubber experiences compression deformation. Because of this, the deformation state of the partitioning component which is made entirely from rubber changes depending on the extent of the pressing, so that the problem arises that stable characteristics cannot be obtained.

The present invention was conceived in view of the above described conventional problem. It is an object of the present invention to provide a vibration isolating apparatus that makes it possible to obtain stable characteristics while maintaining seal property even when a partitioning component which is formed entirely from an elastic body is used.

Means for Solving the Problem

The vibration isolating apparatus according to the present invention is provided with: a first mounting component which is cylindrical and is connected to one of a vibration generating portion and a vibration receiving portion; a second mounting component which is connected to the other one of the vibration generating portion and the vibration receiving portion; a rubber elastic body which is elastically connected to the first mounting component and the second mounting component and which closes off an aperture end on one side of the first mounting component; a diaphragm which closes off an aperture end on the other side of the first mounting component; and a partitioning component that divides a liquid chamber which is formed between the rubber elastic body and the diaphragm and into which a liquid is injected into a main liquid chamber a portion of whose partition walls is formed by the rubber elastic body and whose internal volume is changed by deformation of the rubber elastic body, and an auxiliary liquid chamber a portion of whose partition walls is formed by the diaphragm. The partitioning component is formed entirely from an elastic body, and on the first mounting component there are provided a protruding portion which protrudes inwards in a radial direction, and a first cylindrical portion that is located on the other side of the protruding portion. A toroidal rigid component which is formed from a rigid body which is more rigid than the elastic body is fitted on an inner side of the first cylindrical portion, and in the rigid component there are provided a second cylindrical portion which is located on the same axis as the first cylindrical portion, and a supporting portion which is located on the inner side of the second cylindrical portion and supports the partitioning component. Moreover, any one of the first and second cylindrical portions is located inside the other one of the first and second cylindrical portions, and in the one of the first mounting component and the rigid component that is provided with the other cylindrical portion there are formed respectively an engaging portion which engages with one end portion of the one cylindrical portion, and a caulked portion which is folded inwards in a radial direction and which engages with the other end portion of the one cylindrical portion. In addition, the one cylindrical portion is sandwiched between the engaging portion and the caulked portion, and the partitioning component is sandwiched between the protruding portion and the supporting portion.

In this vibration isolating apparatus, by adjusting the degree to which the caulked portion is folded, the gripping force with which the one cylindrical portion is held between the engaging portion and the caulked portion can be strengthened so as to improve the property of the seal thereof. At this time, because the gripping force with which the partitioning component is held by the supporting portion and the protruding portion is not strengthened even if the degree to which the caulked portion is folded is changed, there is substantially no effect on the partitioning component.

Moreover, in the vibration isolating apparatus according to the present invention, it is preferable for the second cylindrical portion to be located on the inside of the first cylindrical portion, and for the engaging portion and the caulked portion to both be formed on the first mounting component, and for the second cylindrical portion to be sandwiched between the engaging portion and the caulked portion.

By employing this type of structure, it becomes easy to improve the property of the seal between the first cylindrical portion and the second cylindrical portion. Namely, by performing narrowing processing on the inner side in the radial direction on the first cylindrical portion, it becomes possible to improve the property of the seal between the first cylindrical portion and the second cylindrical portion.

Moreover, in the vibration isolating apparatus according to the present invention, it is preferable for thin film-shaped diaphragm rubber which is able to be deformed in accordance with changes in the liquid pressure inside the auxiliary liquid chamber to be formed on the inner side of the rigid component, and for the rigid component to form a diaphragm ring of the diaphragm.

By employing this type of structure, the diaphragm and the rigid component form a single integrated unit, and the number of components can be reduced so that, in addition to the structure being simplified, the number of assembly steps is also reduced.

Moreover, in the vibration isolating apparatus according to the present invention, it is preferable for the rigid component, when viewed in cross-section, to be formed in a concave shape which is formed by a toroidal bottom wall portion, a second cylindrical portion in the shape of an outer circumferential wall that stands upright from an outer edge portion of the bottom wall portion, and a supporting portion in the shape of an inner circumferential wall that stands upright from an inner edge portion of the bottom wall portion, and for an open end of the rigid component to be closed off by the partitioning component, and for a space which is enclosed by the partitioning component, the bottom wall portion, the second cylindrical portion, and the supporting portion to form an orifice that enables the main liquid chamber to communicate with the auxiliary liquid chamber.

By employing this type of structure, an orifice passage is formed by assembling the partitioning component together with the rigid component which has a concave shape when viewed in cross-section. Accordingly, an orifice component in which an orifice passage has been formed is rendered unnecessary so that the number of components can be reduced and, in addition to the structure being simplified, the number of assembly steps is also reduced.

Moreover, in the vibration isolating apparatus according to the present invention, it is preferable for a rubber layer to be interposed between the first cylindrical portion and the second cylindrical portion.

By employing this type of structure, the rubber layer acts as a cushioning material so that the shock caused by the first mounting component (i.e., the first cylindrical portion) striking against the rigid component (i.e., the second cylindrical portion) is suppressed. It becomes difficult for the shock which is generated when the air bubbles created by the cavitation phenomenon burst to be transmitted to the first mounting component. In addition, the property of the seal between the first cylindrical portion and the second cylindrical portion is further improved.

Effects of the Invention

According to the present invention, the gripping force with which the partitioning component is held by the supporting portion and the protruding portion does not change even if the gripping force with which a cylindrical portion is held by the engaging portion and the caulked portion is strengthened. Accordingly, even if a partitioning component which is made entirely from an elastic body is used, it is possible to improve the seal property and secure an airtight liquid chamber while also suppressing deformation of the partitioning component and thus obtain stable characteristics.

BEST MODE FOR CARRYING OUT THE INVENTION

An embodiment of the vibration isolating apparatus of the present invention will now be described based on the drawings.

Figure 1:
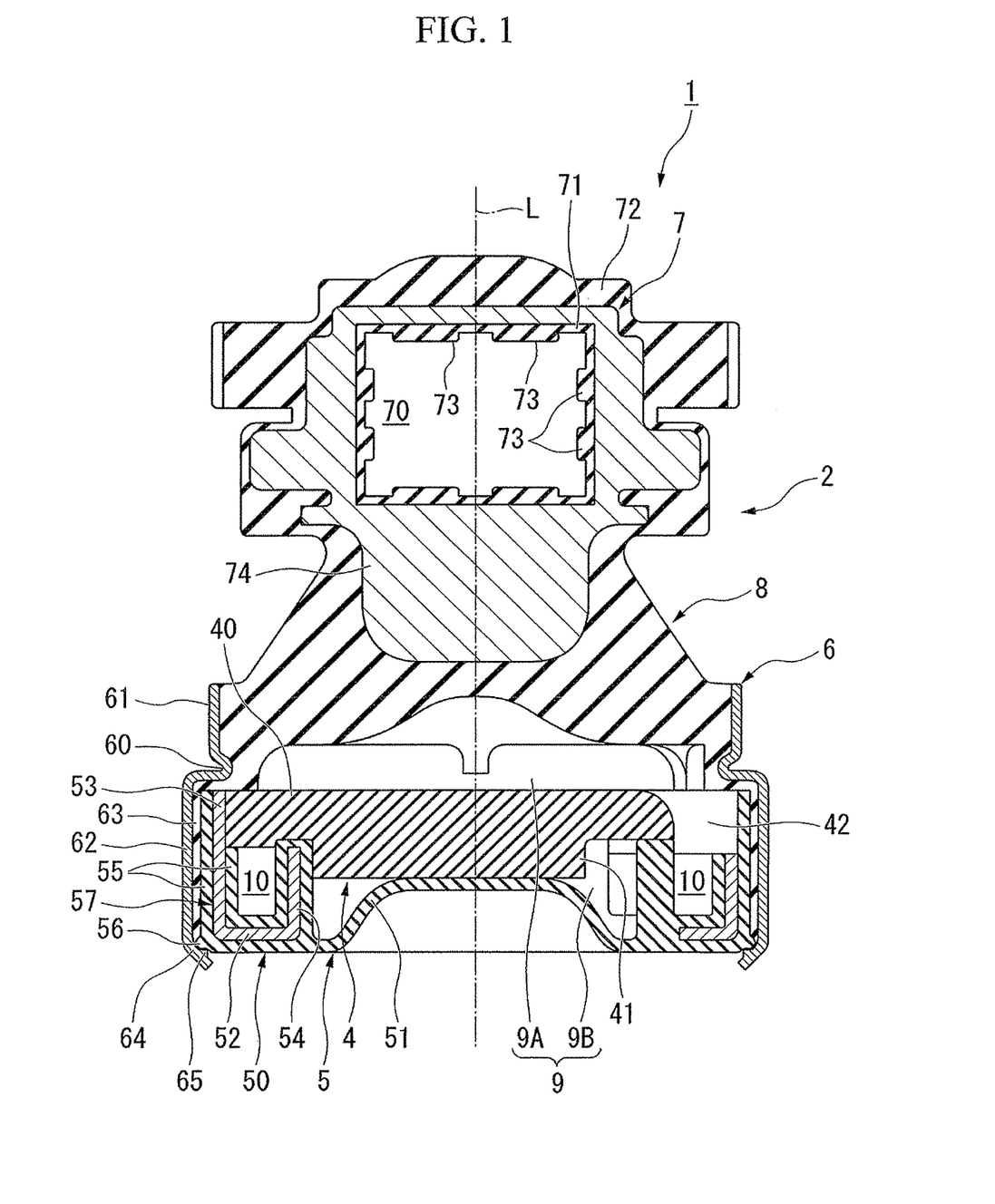
FIG. 1 is a cross-sectional view of a vibration isolating apparatus illustrating an embodiment of the present invention.
Figure 2:
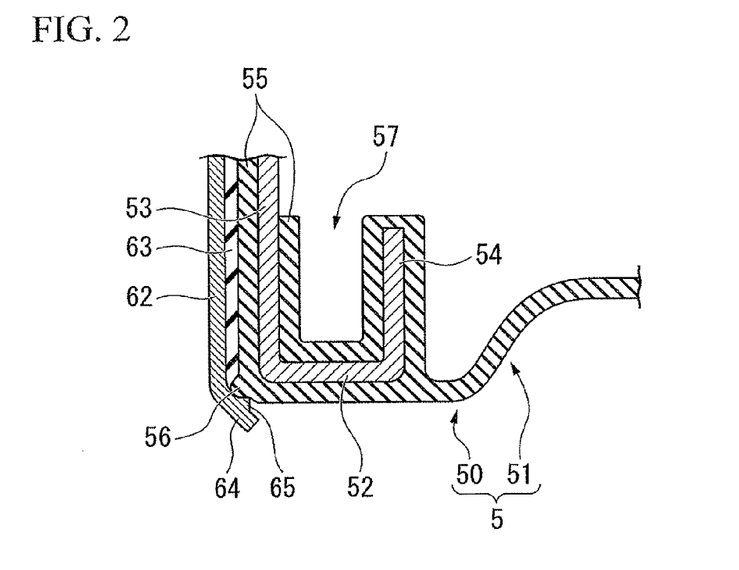
FIG. 2 is a cross-sectional view showing an enlargement of a portion of a vibration isolating apparatus illustrating an embodiment of the present invention.

FIG. 1 is a cross-sectional view of a vibration isolating apparatus 1 of embodiment of the present invention. FIG. 2 is a cross-sectional view showing an enlargement of a portion of the vibration isolating apparatus 1.

Note that in the present embodiment, the bottom side in FIG. 1 is the bound side, namely, is the direction in which a static load (i.e., an initial load) is input when the vibration isolating apparatus is installed, and the top side in FIG. 1 is the rebound side, namely, is the opposite side from the static load input direction. In the description given below, the bound side (i.e., the other side) is taken as the bottom side and the rebound side (i.e., the one side) is taken as the top side. Moreover, in the present embodiment, the axial direction (i.e., a perpendicular direction relative to the surface of the paper on which FIG. 1 is shown) of an inner cylinder 7 (described below) is taken as a front-rear direction, while a horizontal direction (i.e., a horizontal direction in FIG. 1) which is orthogonal to the axial direction of the inner cylinder 7 is taken as a left-right direction. Furthermore, a symbol L in FIG. 1 shows a center axis of an outer cylinder 6 (described below), and is referred to below simply as the axis L.

The vibration isolating apparatus 1 is used when an engine (serving as an example of a vibration generating portion) is mounted in a vehicle body (serving as an example of a vibration receiving portion), and is used to dampen vibration from the vibration generating portion.

As is shown in FIG. 1, the vibration isolating apparatus 1 has a structure in which a partitioning component 4 and a diaphragm 5 are each assembled on main body rubber 2. More specifically, the vibration isolating apparatus 1 is provided with an outer cylinder 6 (corresponding to a cylinder component of the present invention) that is linked to a vehicle body (not shown) via a vehicle body bracket (not shown), an inner cylinder 7 (corresponding to a mounting component of the present invention) that is located above the outer cylinder 6 and is linked to an engine (not shown) via an engine bracket (not shown), a rubber elastic body 8 that elastically links the outer cylinder 6 to the inner cylinder 7, a diaphragm 5 that is provided at a bottom end of the outer cylinder 6, and a partitioning component 4 that divides a liquid chamber 9 that is formed between the rubber elastic body 8 and the diaphragm 5 into a main liquid chamber 9A and an auxiliary liquid chamber 9B. Note that the aforementioned main body rubber 2 is formed by the outer cylinder 6, the inner cylinder 7, and the rubber elastic body 8.

The outer cylinder 6 is a substantially circular cylinder-shaped metal fitting whose both ends are both open. The schematic structure of the outer cylinder 6 is made up of a recessed portion 60 (corresponding to the protruding portion and engaging portion of the present invention) that is located in a midway portion in the direction of an axis L of the outer cylinder 6 and has a toroidal shape, a substantially circular cylinder-shaped upper side cylindrical portion 61 that is formed on an upper side of the recessed portion 60, and a substantially circular cylinder-shaped lower side cylindrical portion 62 (corresponding to the first cylindrical portion of the present invention) that is formed on a lower side of the recessed portion 60.

The recessed portion 60 is a protruding portion which protrudes inwards in a radial direction beyond the upper side cylindrical portion 61 and lower side cylindrical portion 62, and functions as an engaging portion that engages with a top end portion of an outer circumferential wall portion 53 (corresponding to the second cylindrical portion of the present invention) of a diaphragm ring 50 (described below—corresponding to the rigid component of the present invention). More specifically, the recessed portion 60 is a projecting portion which has undergone bending deformation towards the inner side in a radial direction so as to narrow the aperture size of the circular cylinder-shaped outer cylinder 6, and is formed extending around the entire circumference of the outer cylinder 6 between the upper side cylindrical portion 61 and the lower side cylindrical portion 62. The lower side cylindrical portion 62 is a circular cylinder portion having a larger diameter than the upper side cylindrical portion 61, and the diaphragm 5 (i.e., the diaphragm ring 50) is fitted into the inner side thereof The rubber elastic body 8 is adhered to an inner circumferential surface of the upper side cylindrical portion 61, and the inner side of the upper side cylindrical portion 61 is closed off by the rubber elastic body 8. Covering rubber 63 (corresponding to the rubber layer of the present invention) is formed integrally with the rubber elastic body 8 so as to extend around the entire circumference of the inner circumferential surface of the recessed portion 60 and lower side cylindrical portion 62, and the diameter of the internal space of the outer cylinder 6 is contracted so that a step shape is formed in locations which correspond to the inner side of the recessed portion 60.

Moreover, a caulked portion 64 which is folded towards the inner side in the radial direction at a predetermined angle (for example, 45°), and is fixed by means of caulking to a bottom end portion of the outer circumferential wall portion 53 of the diaphragm ring 50 (described below) is formed at a bottom end portion of the outer cylinder 6 (i.e., the lower side cylindrical portion 62). This caulked portion 64 is formed extending around the entire circumference of the outer cylinder 6, and an inwardly protruding portion 65 is provided on an inner circumferential surface of the caulked portion 64 extending around the entire circumference thereof.

The inner cylinder 7 is a hollow component in which is formed a through hole 70 which extends in a direction which is orthogonal to the axis L and whose both ends are open, and which is substantially rectangular when viewed in cross-section. Covering rubber 71 and covering rubber 72 are formed respectively on an inner circumferential surface of the through hole 70 and on an outer circumferential surface of the inner cylinder 7. Protruding bar portions 73 are formed in a plurality of mutually separated rows extending in the front-rear direction on the covering rubber 71 which covers the inner circumferential surface of the through hole 70. A protruding portion 74 that protrudes downwards is provided on a bottom portion of the inner cylinder 7.

The rubber elastic body 8 is a substantially dome-shaped rubber elastic body which closes off the aperture end on the upper end side of the outer cylinder 6, and is interposed between the upper side cylindrical portion 61 of the outer cylinder 6 and the protruding portion 74 of the inner cylinder 7. Namely, the outer circumferential surface of the rubber elastic body 8 is vulcanized and adheres to the top side cylindrical portion 61 of the outer cylinder 6, and the top portion of the rubber elastic body 8 is vulcanized and adheres to the protruding portion 74 of the inner cylinder 7.

The diaphragm 5 is a component which closes off the aperture end on the bottom end side of the outer cylinder 6, and is provided with the diaphragm ring 50 (corresponding to the rigid component of the present invention) which is fitted into the inner side of the bottom side cylindrical portion 62 of the outer cylinder 6, and with the diaphragm rubber 51 which is formed on the inner side of the diaphragm ring 50.

The diaphragm ring 50 is a toroidal ring fitting having the axis L as its center axis, and is a toroidal rigid component that is formed from a hard material which is harder than the rubber elastic body used to form the rubber elastic body 8 and the partitioning component 4 and the like. More specifically, as is shown in FIG. 1 and FIG. 2, the diaphragm ring 50 is formed in a concave shape when viewed in cross-section, and is formed by a toroidal bottom wall portion 52 that extends over a perpendicular plane relative to the axis L, a circular cylinder-shaped outer circumferential wall portion 53 that stands upright on an outer edge portion of the bottom wall portion 52, and a circular cylinder-shaped inner circumferential wall portion 54 (corresponding to the supporting portion of the present invention) that stands upright on an inner edge portion of the toroidal portion 53. Namely, the diaphragm ring 50 has a structure in which a concave groove 57 which is formed by the bottom wall portion 52, the outer circumferential wall portion 53 and the inner circumferential wall portion 54 extends in a circumferential direction.

The outer circumferential wall portions 53 is located on the inner side of the lower side cylindrical portion 62 of the outer cylinder 6, and is sandwiched between the recessed portion 60 and the caulked portion 64 of the outer cylinder 6. More specifically, a top end surface of the outer circumferential wall portion 53 contacts against a bottom surface of the covering rubber 63 which covers the recessed portion 60, and a bottom end surface of the outer circumferential wall portion 53 contacts against an inner circumferential surface of the caulked portion 64 via covering rubber 55 of the diaphragm ring 50 (described below). The length dimension in the direction of the axis L of the inner circumferential wall portion 54 is shorter than that of the outer circumferential wall portion 53, and a gap into which the partitioning component 4 is interposed is opened between a top end surface of the inner circumferential wall portion 54 and the bottom surface of the covering rubber 63 which covers the recessed portion 60. Moreover, an auxiliary liquid chamber-side orifice which allows an orifice passage 10 (described below) to communicate with the auxiliary liquid chamber 9B is formed in the inner circumferential wall portion 54. This auxiliary liquid chamber-side orifice is a notched portion which is formed by cutting a notch in a portion of the inner circumferential wall portion 54, and an inner side of the concave groove 57 of the diaphragm ring 50 is able to communicate with the auxiliary liquid chamber 9B via this auxiliary liquid chamber-side orifice.

Covering rubber 55 (corresponding to the rubber layer of the present invention) which is formed integrally with the diaphragm rubber 51 is formed on a surface of the diaphragm ring 50. Specifically, the covering rubber 55 is vulcanized and adheres to the top and bottom surfaces of the bottom wall portion 52, the inner and outer circumferential surfaces of the outer circumferential wall portion 53, and the inner and outer circumferential surfaces of the inner circumferential wall portion 54 over the entire circumferences respectively thereof. Moreover, a protruding portion 56 which engages with the protruding portion 65 of the outer cylinder 6 is formed extending around the entire circumference of the outer side surface of the covering rubber 55. Specifically, the protruding portion 56 of the diaphragm ring 50 is formed on an angle portion between the bottom wall portion 52 and the outer circumferential wall portion 53 of the covering rubber 55.

As is shown in FIG. 1, the diaphragm rubber 51 is formed from thin-membrane rubber which is able to undergo deformation in accordance with changes in the liquid pressure (i.e., internal pressure) inside the auxiliary liquid chamber 9B, and bulges upwards in a saucer shape. Outer circumferential portions of this diaphragm rubber 51 are formed integrally with the covering rubber 55 of the diaphragm ring 50 around the entire circumference thereof, and the inner side of the diaphragm ring 50 is closed off by this diaphragm rubber 51. More specifically, outer circumferential portions of the diaphragm rubber 51 are connected to an angle portion between the bottom wall portion 52 and the inner circumferential wall portion 54 of the covering rubber 55.

The liquid chamber 9 which is formed between the rubber elastic body 8 and the diaphragm 5 is a sealed space in which a liquid has been enclosed, and is divided into the rebound-side main liquid chamber 9A and the bound-side auxiliary liquid chamber 9B by the partitioning component 4 which is placed in the interior thereof. The main liquid chamber 9A is a chamber having a part of the partition wall thereof (i.e., a top wall) formed by the rubber elastic body 8, and the internal volume of the main liquid chamber 9A is changed by the deformation of the rubber elastic body 8. The auxiliary liquid chamber 9B is a chamber having a part of the partition wall thereof (i.e., a bottom wall) formed by the diaphragm 5, and the internal volume of the auxiliary liquid chamber 9B changes as a result of the diaphragm rubber 51 undergoing deformation due to changes in the liquid pressure (i.e., the internal pressure) inside the auxiliary liquid chamber 9B.

The partitioning component 4 is a circular disk-shaped component (having a circular shape when seen in plan view) which is arranged perpendicularly to the axis L, and is a component that is formed entirely from a rubber elastic body so as to be easily elastically deformed. Specifically, the partitioning component 4 is formed by a circular base plate portion 40, and by a substantially circular protruding portion 41 which protrudes from a bottom surface of a center portion of the base plate portion 40 and whose diameter is less than that of the base plate portion 40. The base plate portion 40 fits into the inner side of the top end portion of the outer circumferential wall portion 53 of the diaphragm ring 50, and an outer circumferential surface of the base plate portion 40 is in tight contact with (i.e. is pressed up against) an inner circumferential surface of the top end portion of the outer circumferential wall portion 53. A main liquid chamber-side orifice 42 which allows the orifice passage 10 (described below) to communicate with the main liquid chamber 9A is formed in the base plate portion 40. This main liquid chamber-side orifice 42 is a notched portion which is formed by cutting a notch in a portion of an outer circumferential portion of the base plate portion 40, and an inner side of the concave groove 57 of the diaphragm ring 50 is able to communicate with the main liquid chamber 9A via this main liquid chamber-side orifice 42. The protruding portion 41 fits into the inner side of the top end portion of the inner circumferential wall portion 54 of the diaphragm ring 50, and an outer circumferential surface of the protruding portion 41 is in tight contact with (i.e. is pressed up against) an inner circumferential surface of the top end portion of the inner circumferential wall portion 54. The partitioning component 4 which is formed having the above described structure is sandwiched between the recessed portion 60 of the outer cylinder 6 and the inner circumferential wall portion 54 of the diaphragm ring 50. More specifically, a top end surface of the outer circumferential portion of the base plate portion 40 contacts a bottom surface of the covering rubber 63 which covers the recessed portion 60, and a bottom end surface of the base plate portion 40 at the outer circumference of the protruding portion 41 contacts the top end surface of the inner circumferential wall portion 54 via the covering rubber 55 of the diaphragm ring 50.

As a result of the open end of the diaphragm ring 50 which has a concave shape when viewed in cross-section being closed off by the above-described partitioning component 4, the orifice passage 10 which is substantially rectangular when viewed in cross-section and which allows the main liquid chamber 9A to communicate with the auxiliary liquid chamber 9B is formed. Namely, the orifice passage 10 is a space which is enclosed by the partitioning component 4, the bottom wall portion 52, the outer circumferential wall portion 53, and the inner circumferential wall portion 54, and which extends in the circumferential direction of the outer cylinder 6 and the diaphragm ring 50. Moreover, this orifice passage 10 communicates with the main liquid chamber 9A via the main liquid chamber-side orifice 42 which is formed in the partitioning component 4, and communicates with the auxiliary liquid chamber 9B via an auxiliary liquid chamber-side orifice (not shown) which is formed in the inner circumferential wall portions 54. This orifice passage 10 is a liquid passage which generates liquid column resonance (i.e., a resonance phenomenon) in the liquid which is circulating through the orifice passage 10 when vibration is input into the vibration isolating apparatus 1, and thereby dampens this vibration. The orifice passage 10 is set (i.e., tuned) so as to correspond to the frequency and amplitude of shaking vibration, namely, of a resonant vibration which has a large amplitude and a low frequency range (for example, 8 Hz through 12 Hz).

Next, a manufacturing process for the vibration isolating apparatus 1 having the above described structure will be described.

Firstly, a step to foil the main body rubber 2 which is made up of the outer cylinder 6, the inner cylinder 7, and the rubber elastic body 8 is performed. More specifically, the outer cylinder 6 and the inner cylinder 7 are placed respectively in predetermined positions within a mold which is used to mold the rubber elastic body 8, the covering rubber 71 and the covering rubber 72 of the inner cylinder 7, and the covering rubber 63 of the outer cylinder 6. In addition, an adhesive agent is coated respectively on the inner circumferential surface of the outer cylinder 6, the outer circumferential surface of the inner cylinder 7, and on the inner circumferential surface of the through hole 70 in the inner cylinder 7. Thereafter, vulcanized rubber is supplied to the interior of the mold and vulcanization molding is performed respectively on the rubber elastic body 8, and the respective covering rubbers 63, 71, and 72. After the rubber elastic body 8 and the like have been cured, they are removed from the mold. As a result of this, the main body rubber 2 is manufactured.

Meanwhile, a step to form the diaphragm 5 which is made up of the diaphragm ring 50 and the diaphragm rubber 51 is performed. More specifically, the diaphragm ring 50 is placed in a predetermined position within a mold which is used to mold the diaphragm rubber 51 and the covering rubber 55 of the diaphragm ring 50. In addition, an adhesive agent is coated onto the surface of the diaphragm ring 50. Thereafter, vulcanized rubber is supplied to the interior of the mold and vulcanization molding is performed respectively on the diaphragm rubber 51 and the covering rubber 55. After the diaphragm rubber 51 and the like have been cured, they are removed from the mold. As a result of this, the diaphragm 5 is manufactured.

Next, a step to assemble the partitioning component 4 in the diaphragm 5 is performed. More specifically, the base plate portion 40 of the partitioning component 4 is fitted by means of press-insertion on the inner side of the top end portion of the outer circumferential wall portion 53 of the diaphragm ring 50. The protruding portion 41 of the partitioning component 4 is fitted by means of press-insertion on the inner side of the top end portion of the inner circumferential wall portion 54 of the diaphragm ring 50. As a result of this, the base plate portion 40 is mounted on the top end surface of the inner circumferential wall portion 54, and the outer circumferential surface of the base plate portion 40 is placed in tight contact with the inner circumferential surface of the outer circumferential wall portion 53. As a result of this, the orifice passage 10 is formed. At this time, the relative positions of the main liquid chamber-side orifice 42 which is formed in the partitioning component 4 and the auxiliary liquid chamber-side orifice (not shown) which is formed in the diaphragm ring 50 are fixed such that the flow path length of the orifice passage 10 is a predetermined length.

Next, a step to assemble the diaphragm 5, in which the partitioning component 4 has been fitted in the manner described above, in the main body rubber 2 is performed. More specifically, the diaphragm ring 50 is fitted by means of press-insertion on the inner side of the lower side cylindrical portion 62, and the covering rubber 55 on the outer circumferential surface of the outer circumferential wall portion 53 of the diaphragm ring 50 is placed in tight contact with the covering rubber 63 on the inner circumferential surface of the lower side cylindrical portion 62. In addition, the top end surface of the outer circumferential wall portion 53 of the diaphragm ring 50 and the top surface of the outer circumferential portion of the base plate portion 40 of the partitioning component 4 are placed in contact with the bottom end surface of the covering rubber 63 of the recessed portion 60. As a result of this, the top end of the outer circumferential wall portion 53 is engaged in the recessed portion 60, and the outer circumferential portion of the partitioning component 4 is sandwiched between the recessed portion 60 and the inner circumferential wall portion 54.

Next, the bottom end portion (i.e., the caulked portion 64) of the lower side cylindrical portion 62 is folded inwards in the radial direction so that the protruding portion 65 of the core portion 64 becomes engaged with the protruding portion 56 of the covering rubber 55 of the diaphragm ring 50, and the bottom end portion of the lower side cylindrical portion 62 becomes fixed by means of caulking to the bottom end portion of the outer circumferential wall portion 53. As a result of this, the outer circumferential wall portion 53 is sandwiched between the recessed portion 60 and the caulked portion 64. At this time, by adjusting the degree to which the caulked portion 64 is folded, the gripping force with which the outer circumferential wall portion 53 is held between the recessed portion 60 and the caulked portion 64 can be strengthened so as to improve the property of the seal. Moreover, as is described above, even if the gripping force with which the outer circumferential wall portion 53 is held is strengthened by changing the degree to which the caulked portion 64 is folded, the gripping force with which the partitioning component 4 is held by the inner circumferential wall portion 54 and the recessed portion 60 is not strengthened, and there is substantially no effect on the partitioning component 4.

Next, a step to narrow the diameter of the lower side cylindrical portion 62 of the outer cylinder 6 on the inner side in the radial direction (i.e., a narrowing step) is performed. More specifically, for example, using a circular diaphragm or the like, the diameter of the lower side cylindrical portion 62 is narrowed by applying pressure to the lower side cylindrical portion 62 from the outer side in the radial direction towards the inner side in the radial direction. As a result of this, pre-compression force is imparted to the covering rubber 55 and the covering rubber 63 (i.e., rubber layers) that are interposed between the lower side cylindrical portion 62 and the outer circumferential wall portion 53, so that the property of the seal between the lower side cylindrical portion 62 and the outer circumferential wall portion 53 is improved. This seal property can be suitably adjusted by adjusting the amount of diameter contraction obtained from this narrowing step. Moreover, because the gripping force with which the partitioning component 4 is held by the inner circumferential wall portion 54 and the recessed portion 60 is substantially unchanged even if this narrowing step is performed, there is substantially no effect on the partitioning component 4 which is formed solely from rubber. Note that if a sufficient seal property can be demonstrated simply by the press-insertion of the outer circumferential wall portion 53 on the inner side of the lower side cylindrical portion 62, then it is possible to omit the above described narrowing step.

Next, a step to fill the liquid chamber 9 with a liquid is performed. More specifically, the interior of the liquid chamber 9 formed on the inner side of the outer cylinder 6 is vacuumized, and the interior of the liquid chamber 9 is then filled with a liquid by injecting the liquid through a liquid injection port (not shown) into the liquid chamber 9 which is in a vacuum state. The liquid injection port is then closed, so as to seal the liquid chamber 9.

As a result of this, the manufacturing of the vibration isolating apparatus 1 is completed.

Next, an operation of the vibration isolating apparatus 1 having the above described structure will be described.

In the vibration isolating apparatus 1 having the above described structure, vibration from an engine in a vehicle is transmitted to the inner cylinder 7 via an engine bracket (not shown), and is then transmitted from the inner cylinder 7 to the rubber elastic body 8 so that the rubber elastic body 8 is elastically deformed. At this time, the rubber elastic body 8 acts as a vibration absorption main body, and the vibration is absorbed by a vibration absorption action which is based on internal friction and the like inside the rubber elastic body 8. The vibration propagated from the outer cylinder 6 to the vehicle body side via a vehicle body bracket (not shown) is thus reduced.

Moreover, if shaking vibration having a relatively low frequency and a relatively large amplitude is input into the above described vibration isolating apparatus 1, the rubber elastic body 8 is elastically deformed by this shaking vibration, and a relatively large liquid pressure change is generated within the main liquid chamber 9A so that the liquid pressure within the main liquid chamber 9A experiences a repeated cycle of large rises and falls. At this time, the liquid inside the liquid chamber 9 circulates alternatingly between the main liquid chamber 9A and the auxiliary liquid chamber 9B via the orifice passage 10. Because the orifice passage 10 is tuned in order to deal with shaking vibration, when the liquid inside the liquid chamber 9 comes and goes between the main liquid chamber 9A and the auxiliary liquid chamber 9B via the orifice passage 10, as is described above, liquid column resonance is generated in the liquid circulating through the orifice passage 10. Because of this, shaking vibration which is input into the vibration isolating apparatus 1 is dampened by the liquid column resonance in the orifice passage 10, and the shaking vibration which is transmitted to the vehicle body side is reduced.

In contrast, if idling vibration having a relatively high frequency (for example, 20 Hz to 40 Hz) and a small amplitude is input into the vibration isolating apparatus 1, the rubber elastic body 8 is elastically deformed by this idling vibration so that relatively small changes in liquid pressure are generated inside the main liquid chamber 9A, and the liquid pressure inside the main liquid chamber 9A experiences a repeated cycle of small rises and falls. At this time, it is difficult for the liquid to flow in the orifice passage 10 which has been tuned so as to correspond to shaking vibration. However, the liquid pressure changes inside the main liquid chamber 9A are lessened by the partitioning component 4, which is made entirely from rubber, vibrating in the direction of the axis L in synchronization with the liquid pressure changes in the main liquid chamber 9A. Because of this, idling vibration which is input into the vibration isolating apparatus 1 is dampened by the vibration of the partitioning component 4, and the idling vibration which is transmitted to the vehicle body side is reduced.

Moreover, after a large vibration in the bound direction has been input into the vibration isolating apparatus 1 and the liquid pressure inside main liquid chamber 9A has experienced an abrupt rise, when, as a reaction to this, a vibration is input in the rebound direction and the main liquid chamber 9A changes to negative pressure, there are cases when a cavitation phenomenon occurs in which a large number of air bubbles are created in the liquid between the main liquid chamber-side orifice 86 and the main liquid chamber 9A. In the above described vibration isolating apparatus 1, because the partitioning component 4 is formed entirely from rubber, the shock generated when the air bubbles created by the cavitation phenomenon burst is absorbed by the partitioning component 4.

According to the vibration isolating apparatus 1 having the above described structure, because the partitioning component 4 is made entirely from rubber and the shock generated when the air bubbles created by the cavitation phenomenon burst is absorbed, it is possible to suppress the generation of abnormal noise caused by the cavitation phenomenon.

Moreover, according to the above described vibration isolating apparatus 1, even if the gripping force with which the outer circumferential wall portion 53 is held by the recessed portion 60 and the caulked portion 64 is strengthened, there is no change in the gripping force with which the partitioning component 4 is held by the inner circumferential wall portion 54 and the recessed portion 60. Because of this, even when the partitioning component 4 which is formed entirely from a rubber elastic body is used, it is still possible to improve the seal property and secure a tight seal for the liquid chamber 9 while suppressing deformation of the rubber partitioning component 4 and stabilizing the characteristics thereof.

Moreover, according to the above described vibration isolating apparatus 1, the outer circumferential wall portion 53 of the diaphragm 5 is placed on the inner side of the lower side cylindrical portion 62 of the outer cylinder 6, and the recessed portion 60 and the caulked portion 64 are formed respectively on the outer cylinder 6, and the outer circumferential wall portion 53 of the diaphragm 5 is sandwiched between the recessed portion 60 and the caulked portion 64. Accordingly, it is possible to easily improve the property of the seal between the outer cylinder 6 and the diaphragm 5. Namely, as is described above, because it is possible to improve the property of the seal by narrowing the lower side cylindrical portion 62, it is possible to easily improve just the seal property without changing the gripping force of the partitioning component 4 which is made entirely from rubber.

Moreover, according to the above described vibration isolating apparatus 1, because a rigid component is used for the diaphragm ring 50 of the diaphragm 5, the number of components used to make up the vibration isolating apparatus 1 can be reduced, and in addition to the structure of the vibration isolating apparatus 1 being simplified, the number of assembly steps is also reduced. Accordingly, a lowering of the costs of the vibration isolating apparatus 1 can be lowered and the productivity of the vibration isolating apparatus 1 can be improved.

Moreover, according to the above described vibration isolating apparatus 1, the diaphragm ring 50 (which is a rigid component) has a concave shape when viewed in cross-section, and the open end of this diaphragm ring 50 is closed off by the partitioning component 4, and the orifice passage 10 is formed by the partitioning component 4, the bottom wall portion 52, the outer circumferential wall portion 53, and the inner circumferential wall portion 54, As a result of this, any orifice component or the like in which an orifice passage is formed is rendered unnecessary so that the number of components used to make up the vibration isolating apparatus 1 can be reduced, and in addition to the structure of the vibration isolating apparatus 1 being simplified, the number of assembly steps is also reduced. Accordingly, a lowering of the costs of the vibration isolating apparatus 1 can be achieved and the productivity of the vibration isolating apparatus 1 can be improved.

Moreover, according to the above described vibration isolating apparatus 1, the covering rubber 55 and the covering rubber 63 are interposed between the outer circumferential wall portion 53 of the diaphragm ring 50 and the lower side cylindrical portion 62 of the outer cylinder 6. As a result of this, the covering rubber 55 and the covering rubber act as cushioning materials so that the shock caused by the outer circumferential wall portion 53 striking against the lower side cylindrical portion 62 is suppressed, and it becomes difficult for the shock which is generated when the air bubbles created by the cavitation phenomenon burst to be transmitted to the outer cylinder 6. Thereby, the generation of abnormal noise can be satisfactorily restricted. Moreover, the adhesion provided by the covering rubber 55 and the covering rubber 63 is increased, the property of the seal between the outer circumferential wall portion 53 and the lower side cylindrical portion 62 is improved, and the air-tightness of the liquid chamber 9 can be secured.

An embodiment of the vibration isolating apparatus according to the present invention has been described above. However, the present invention is not limited to the above described embodiments and various modifications can be made insofar as they do not depart from the scope of the present invention.

For example, in the above described embodiment, a vibration generation source in the form of an engine (not shown) is connected by means of an engine-side bracket to the inner cylinder 7, and a vibration receiving portion in the form of a vehicle body (not shown) is connected by means of a vehicle body-side bracket or the like to the outer cylinder 6. However, in the present invention, it is also possible for the vibration receiving portion to be connected to the inner cylinder 7 (i.e., to a mounting component), and for the vibration generation source to be connected via an engine-side bracket or the like to the outer cylinder 6 (i.e., to a cylindrical component).

Moreover, in the above described embodiment, a vibration isolating apparatus 1 which is used as an engine mount in a vehicle is described, However, it is also possible for the vibration isolating apparatus of the present invention to be applied to uses other than as an engine mount. For example, it is also possible for the vibration isolating apparatus of the present invention to be used as a mount in a power generator installed in construction machinery, or, alternatively, to be used as a mount for machinery installed in a factory or the like.

Moreover, in the above described embodiment, the inner cylinder 7 extends in a direction which is orthogonal to the axis L, and a press-insertion portion of the engine-side bracket is press-inserted on the inner side of the inner cylinder 7. However, in the present invention, it is also possible for the inner cylinder 7 to be provided on the same axis as the outer cylinder 6, or, alternatively, for an inner cylinder in which a female threaded portion is formed to be provided, and for the bracket to be attached by screwing a bolt into this female threaded portion.

Moreover, in the above described embodiment, the diaphragm 5 having the diaphragm rubber 51 which is shaped such that the center portion thereof bulges upwards is provided. However, the diaphragm of the present invention is not limited to the above described structure. For example, it is also possible to employ a structure in which the bulging portion is not formed in the center portion of the diaphragm rubber, and the diaphragm rubber is drawn in a slack state over the inner side of the diaphragm ring 50.

Moreover, in the above described embodiment, after the main body rubber 2, the partitioning component 4, and the diaphragm 5 have been assembled, a vacuum injection method is employed in which the interior of the liquid chamber 9 is placed in a vacuum and the liquid is then injected therein. However, in the present invention, for example, it is also possible to employ a liquid assembly method in which the interior of the liquid compartment 9 is filled with a liquid by assembling the main body rubber 2, the partitioning component 4, and the diaphragm 5 in the liquid with which the interior of the liquid compartment 9 is to be filled.

Moreover, in the above described embodiment, a description is given of a compression type of vibration isolating apparatus 1 in which the main liquid chamber 9A is mounted in a position on the upper side in a vertical direction, and the auxiliary liquid chamber 9B is mounted in a position on the lower side in the vertical direction. However, the present invention can also be applied to a suspension type of vibration isolating apparatus in which the main liquid chamber 9A is mounted in a position on the lower side in a vertical direction, and the auxiliary liquid chamber 9B is mounted in a position on the upper side in the vertical direction.

Figure 3:
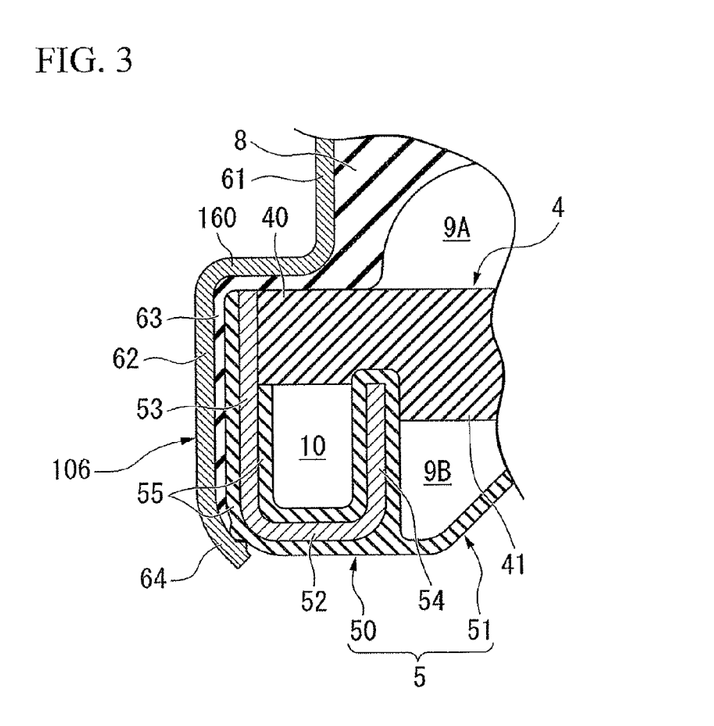
FIG. 3 is a cross-sectional view showing an enlargement of a portion of a vibration isolating apparatus illustrating an embodiment of the present invention.
Figure 4:
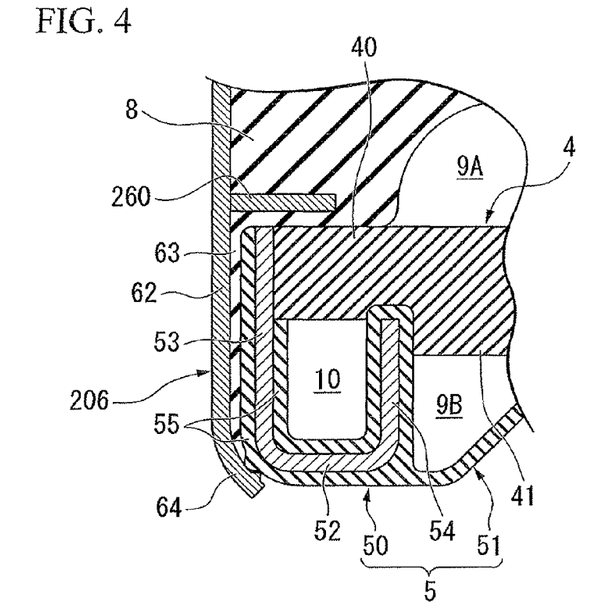
FIG. 4 is a cross-sectional view showing an enlargement of a portion of a vibration isolating apparatus illustrating an embodiment of the present invention.
Figure 5:
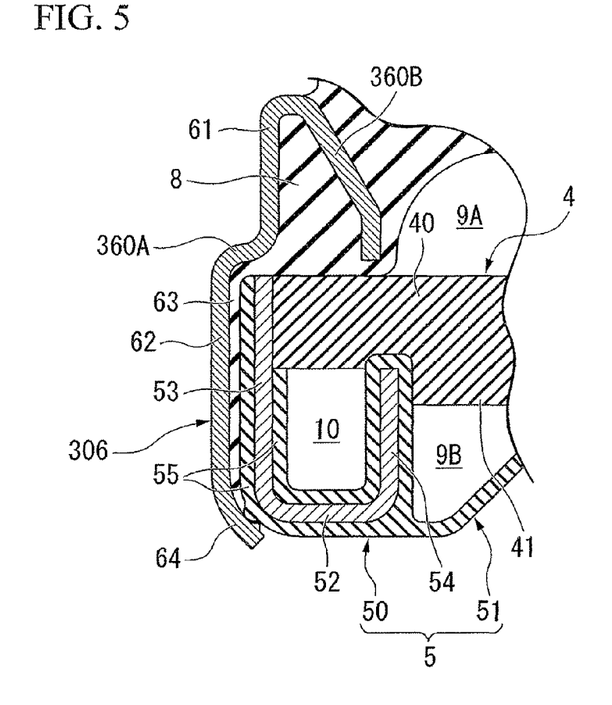
FIG. 5 is a cross-sectional view showing an enlargement of a portion of a vibration isolating apparatus illustrating an embodiment of the present invention.

Moreover, in the above described embodiment, the recessed portion 60 whose diameter is narrowed on the inner side in a radial direction is formed in the outer cylinder 6, and not only is the outer circumferential wall portion 53 held by this recessed portion 60, but the partitioning component 4 is also held by this recessed portion 60. However, the present invention is not limited to a structure in which the recessed portion 60 is formed. It is also possible for an engaging portion and a protruding portion having another shape to be formed as the engaging portion that engages the top end of the outer circumferential wall portion 53 and as the protruding portion that is used to hold the partitioning component 4. For example, as is shown in FIG. 3, as the above described engaging portion and protruding portion it is also possible to use an outer cylinder 106 in which a step portion 160 is formed between the upper side cylindrical portion 61 and the lower side cylindrical portion 62. Moreover, as is shown in FIG. 4, it is also possible for a flange portion 260 to be formed as a projection on an inner circumferential surface of an outer cylinder 206. In addition, in the present invention, it is also possible for an engaging portion that engages with the top end of the outer circumferential wall portion 53 and a protruding portion that holds the partitioning component 4 to be formed independently of each other. For example, as is shown in FIG. 5, it is also possible for a step-shaped engaging portion 360A to be formed in a center portion of the outer cylinder 306, and for a tapered protruding portion 360B whose diameter becomes gradually narrower as it moves downwards to be formed on a top end portion of the outer cylinder 306.

Figure 6:
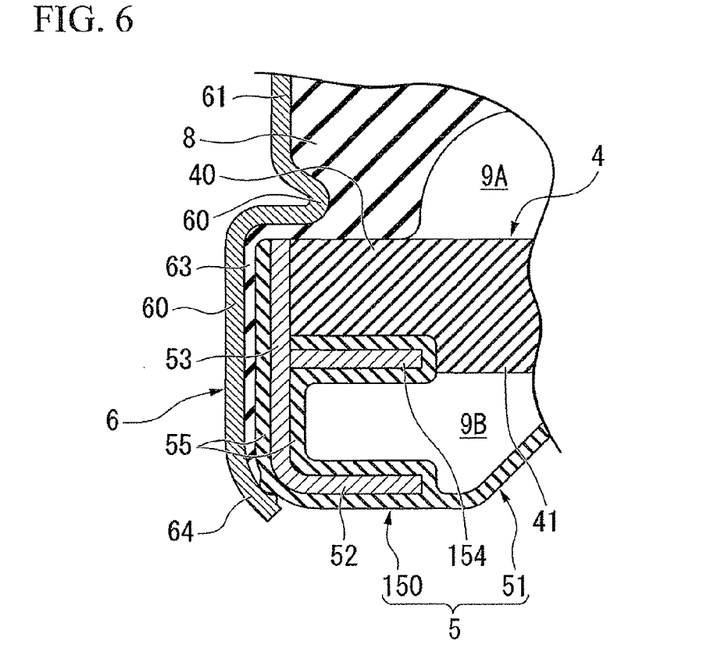
FIG. 6 is a cross-sectional view showing an enlargement of a portion of a vibration isolating apparatus illustrating an embodiment of the present invention.

Moreover, in the above described embodiment, the partitioning component 4 is supported by the inner circumferential wall portion 54 (i.e., a supporting portion) which stands upright on an inner edge portion of the bottom wall portion 52 of the diaphragm ring 50, and the partitioning component 4 is sandwiched between this inner circumferential wall portion 54 and recessed portion 60. However, the present invention is not limited to being provided with a supporting portion having the above described structure. For example, as is shown in FIG. 6, it is also possible for a flange-shaped supporting portion 154 to extend perpendicularly inwards from an inner circumferential surface of the outer circumferential wall portion 53 of a diaphragm ring 150. Note that, in FIG. 6, no orifice passage linking together the main liquid chamber 9A and the auxiliary liquid chamber 9B is depicted. However, it is also possible to provide a separate orifice component (not shown) having an orifice passage (not shown), or, alternatively, to form an orifice passage below the aforementioned supporting portion 154.

Figure 7:
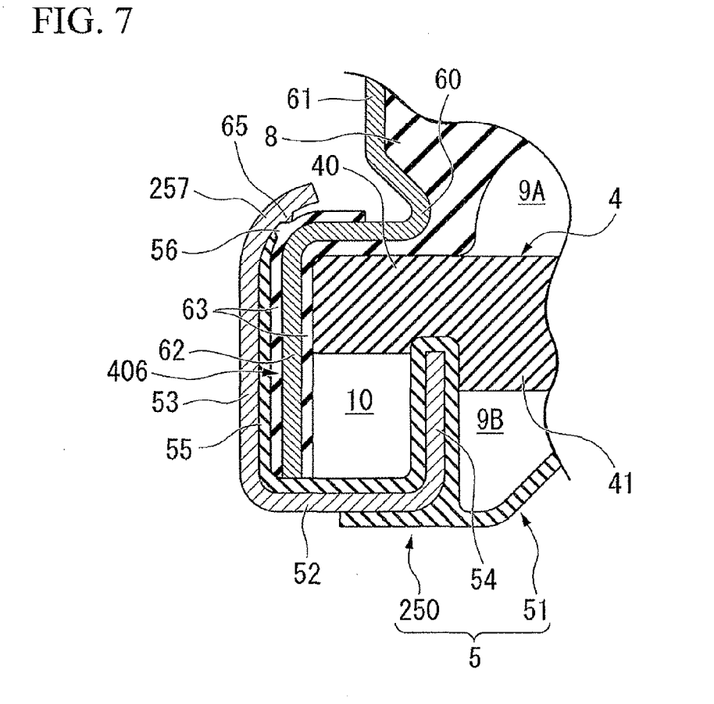
FIG. 7 is a cross-sectional view showing an enlargement of a portion of a vibration isolating apparatus illustrating an embodiment of the present invention.

Moreover, in the above described embodiment, the outer circumferential wall portion 53 (i.e., the second cylindrical portion) of the diaphragm ring 50 is located on the inner side of the lower side cylindrical portion 62 (i.e., the first cylindrical portion) of the outer cylinder 6, and the recessed portion 60 and the caulked portion 64 are both formed in the outer cylinder 6, and the outer circumferential wall portion 53 is sandwiched between the recessed portion 60 and the caulked portion 64 of the outer cylinder 6. However, in the present invention, it is also possible for the first cylindrical portion to be placed on the inner side of the second cylindrical portion. For example, as is shown in FIG. 7, the lower side cylindrical portion 62 of an outer cylinder 406 can be fitted on the inner side of the outer circumferential wall portion 53 of a diaphragm ring 250. In this case, the bottom wall portion 52 of the diaphragm ring 250 forms an engaging portion, and the bottom end of the lower side cylindrical portion 62 abuts against the top surface of the bottom wall portion 52. Moreover, a caulked portion 257 is formed on a top end portion of the outer circumferential wall portion 53, and the top end portion of the outer circumferential wall portion 53 is fixed by means of caulking via this caulking portion 257 to the top end portion of the lower side cylindrical portion 62. As a result of this, the lower side cylindrical portion 62 is sandwiched between the bottom wall portion 52 and the caulked portion 257. However, in this case, because it becomes difficult to perform narrowing processing on the outer circumferential wall portion 53 such as that in the above described embodiment, it becomes no longer possible to easily improve the seal property. Accordingly, as is the case in the above described embodiment, it is preferable for the outer circumferential wall portion 53 to be placed on the inner side of the lower side cylindrical portion 62.

Figure 8:
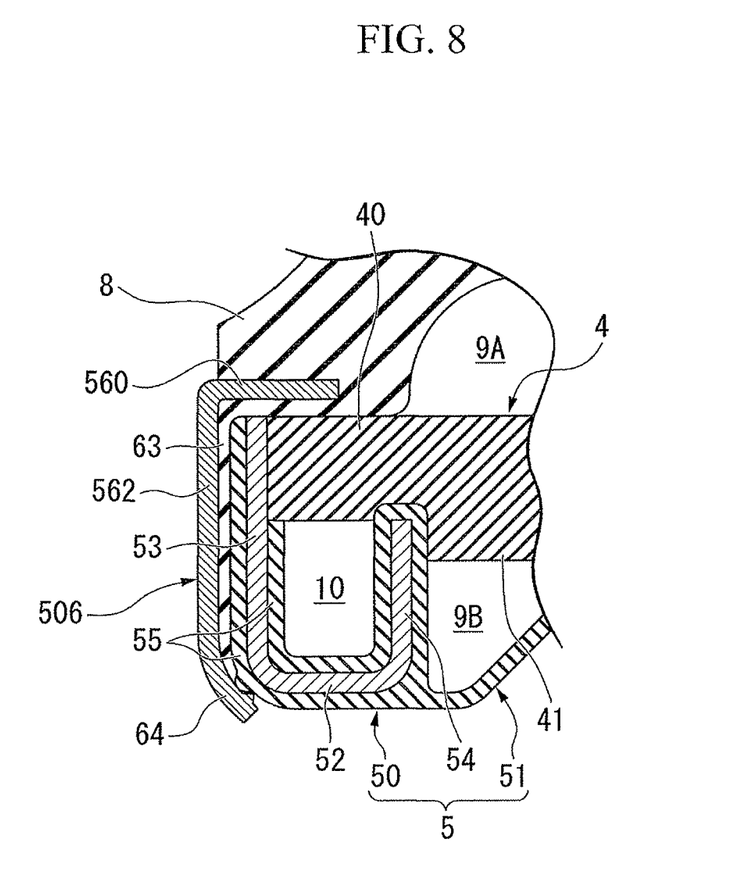
FIG. 8 is a cross-sectional view showing an enlargement of a portion of a vibration isolating apparatus illustrating an embodiment of the present invention.

Moreover, in the above described embodiment, the outer cylinder 6 is provided with the recessed portion 60 between the upper side cylindrical portion 61 and the lower side cylindrical portion 62. However, in the present invention it is also possible to omit the upper side cylindrical portion 61. For example, as is shown in FIG. 8, it is also possible for a flange portion 560 (i.e., the protruding portion and engaging portion) that protrudes inwards in a radial direction to be provided at a top end of an outer cylinder 506 (i.e., a first cylindrical portion 562), and for the caulked portion 64 to be provided at a bottom end of the outer cylinder 506 (i.e., the first cylindrical portion 562). By employing this structure, it is possible to reduce the size of the vibration isolating apparatus by shortening the length thereof in the direction of the axis L. After the first cylindrical component 562 has been narrowed inwardly in the radial direction, it is press-inserted on the inner side of a bracket (not shown).

Moreover, in the above described embodiment, a rigid component is used for the diaphragm ring 50 of the diaphragm 5. However, in the present invention, it is also possible for the rigid component to be provided separately from the diaphragm 5.

Moreover, in the above described embodiment, the diaphragm ring 50 (which is a rigid component) has a concave shape when viewed in cross-section, and the open end of this diaphragm ring 50 is closed off by the partitioning component 4, and the orifice passage 10 is formed by the partitioning component 4, the bottom wall portion 52, the outer circumferential wall portion 53, and the inner circumferential wall portion 54. However, the present invention is not limited to having a rigid component having the above described shape and may also have a rigid component having another shape. For example, the rigid component may also be one that does not form the orifice passage 10. In this case, an orifice component in which an orifice passage has been formed may be provided separately, or, alternatively, an orifice passage may be formed in the partitioning component 4.

Moreover, in the above described embodiment a structure is employed in which the covering rubber 63 is formed on the inner circumferential surface of the lower side cylindrical portion 62, the covering rubber 55 is formed on the outer circumferential surface of the outer circumferential wall portion 53, and the covering rubber 55 and the covering rubber 63 are interposed between the lower side cylindrical portion 62 and the outer circumferential wall portion 53. However, in the present invention, it is also possible for covering rubber to be formed on only one of the lower side cylindrical portion 62 and the outer circumferential wall portion 53, or, alternatively, for a structure to be employed in which a rubber layer is not interposed between the lower side cylindrical portion 62 and the outer circumferential wall portion 53.

In addition to the above, the component elements of the above described embodiment can be appropriately replaced with known component elements insofar as they do not depart from the scope of the present invention. Suitable combinations that include the above variant examples may also be employed.

INDUSTRIAL APPLICABILITY

According to the present invention, in a vibration isolating apparatus that is used, for example, when a vibration generating portion such as an engine of an automobile is mounted in a vibration receiving portion such as a vehicle body, it is possible to obtain stable characteristics while securing seal property even when a partitioning component which is formed entirely from an elastic body is used.

DESCRIPTION OF THE REFERENCE NUMERALS

1 . . . Vibration isolating apparatus, 4 . . . Partitioning component, 5 . . . Diaphragm, 6, 106, 206, 306, 406, 506 . . . Outer cylinder (First mounting component), 7 . . . Inner cylinder (Second mounting component), 8 . . . Rubber elastic body, 9 . . . Liquid chamber, 9A . . . main liquid chamber, 9B . . . Auxiliary liquid chamber, 10 . . . Orifice passage, 50, 150, 250 . . . Diaphragm ring (Rigid component), 51 . . . Diaphragm rubber, 52 . . . Bottom wall portion, 53 . . . Outer circumferential wall portion (Second cylindrical portion), 54 . . . Inner circumferential wall portion (Supporting portion), 55 . . . Covering rubber (Rubber layer), 60 . . . Recessed portion (Protruding portion, Engaging portion), 62 . . . Lower side cylindrical portion (First cylindrical portion), 63 . . . Covering rubber (Rubber layer), 64 . . . Caulked portion, 154 . . . Supporting portion, 160 . . . Step portion (Protruding portion, Engaging portion), 257 . . . Caulked portion, 260, 560 . . . Flange portion (Protruding portion, Engaging portion), 360A . . . Engaging portion, 360B . . . Protruding portion, 562 . . . First cylindrical portion, L . . . Axis (Center axis)

What is claimed is:

1. A vibration isolating apparatus comprising:
a first mounting component which is cylindrical and is connected to one of a vibration generating portion and a vibration receiving portion,
a second mounting component which is connected to the other one of the vibration generating portion and the vibration receiving portion;
a rubber elastic body which is elastically connected to the first mounting component and the second mounting component and which closes off an aperture end on one side of the first mounting component;
a diaphragm which closes off an aperture end on the other side of the first mounting component; and
a partitioning component that divides a liquid chamber which is formed between the rubber elastic body and the diaphragm and into which a liquid is injected into a main liquid chamber a portion of whose partition walls is formed by the rubber elastic body and whose internal volume is changed by deformation of the rubber elastic body, and an auxiliary liquid chamber a portion of whose partition walls is formed by the diaphragm, wherein the partitioning component is formed entirely from an elastic body, and on the first mounting component there are provided a protruding portion which protrudes inwards in a radial direction, and a first cylindrical portion that is located on the other side of the protruding portion, and a toroidal rigid component which is formed from a rigid body which is more rigid than the elastic body is fitted on an inner side of the first cylindrical portion, and in the rigid component there are provided a second cylindrical portion which is located on the same axis as the first cylindrical portion, and a supporting portion which is located on the inner side of the second cylindrical portion and supports the partitioning component, and any one of the first and second cylindrical portions is located inside the other one of the first and second cylindrical portions, and in the one of the first mounting component and the rigid component that is provided with the other cylindrical portion there are formed respectively an engaging portion which engages with one end portion of the one cylindrical portion, and a caulked portion which is folded inwards in a radial direction and which engages with the other end portion of the one cylindrical portion, and the one cylindrical portion is sandwiched between the engaging portion and the caulked portion, and the partitioning component is sandwiched between the protruding portion and the supporting, portion and wherein, when viewed in cross-section, the rigid component is formed in a concave shape which is formed by a toroidal bottom wall portion, the second cylindrical portion in the shape of an outer circumferential wall that stands upright from an outer edge portion of the bottom wall portion, and the supporting portion in the shape of an inner circumferential wall that stands upright from an inner edge portion of the bottom wall portion, and an open end of the rigid component is closed off by the partitioning component, and a space which is enclosed by the partitioning component, the bottom wall portion, the second cylindrical portion, and the supporting portion forms an orifice that enables the main liquid chamber to communicate with the auxiliary liquid chamber.

2. The vibration isolating apparatus according to claim 1, wherein a rubber layer is interposed between the first cylindrical portion and the second cylindrical portion.

3. The vibration isolating apparatus according to claim 1, wherein the second cylindrical portion is located on the inside of the first cylindrical portion and the engaging portion and the caulked portion are both formed on the first mounting component, and the second cylindrical portion is sandwiched between the engaging portion and the caulked portion.

4. The vibration isolating apparatus according to claim 1, wherein thin film-shaped diaphragm rubber which is able to be deformed in accordance with change in the liquid pressure inside the auxiliary liquid chamber is formed on the inner side of the rigid component, and the rigid component forms a diaphragm ring of the diaphragm.

* * * * *